Figure 1:
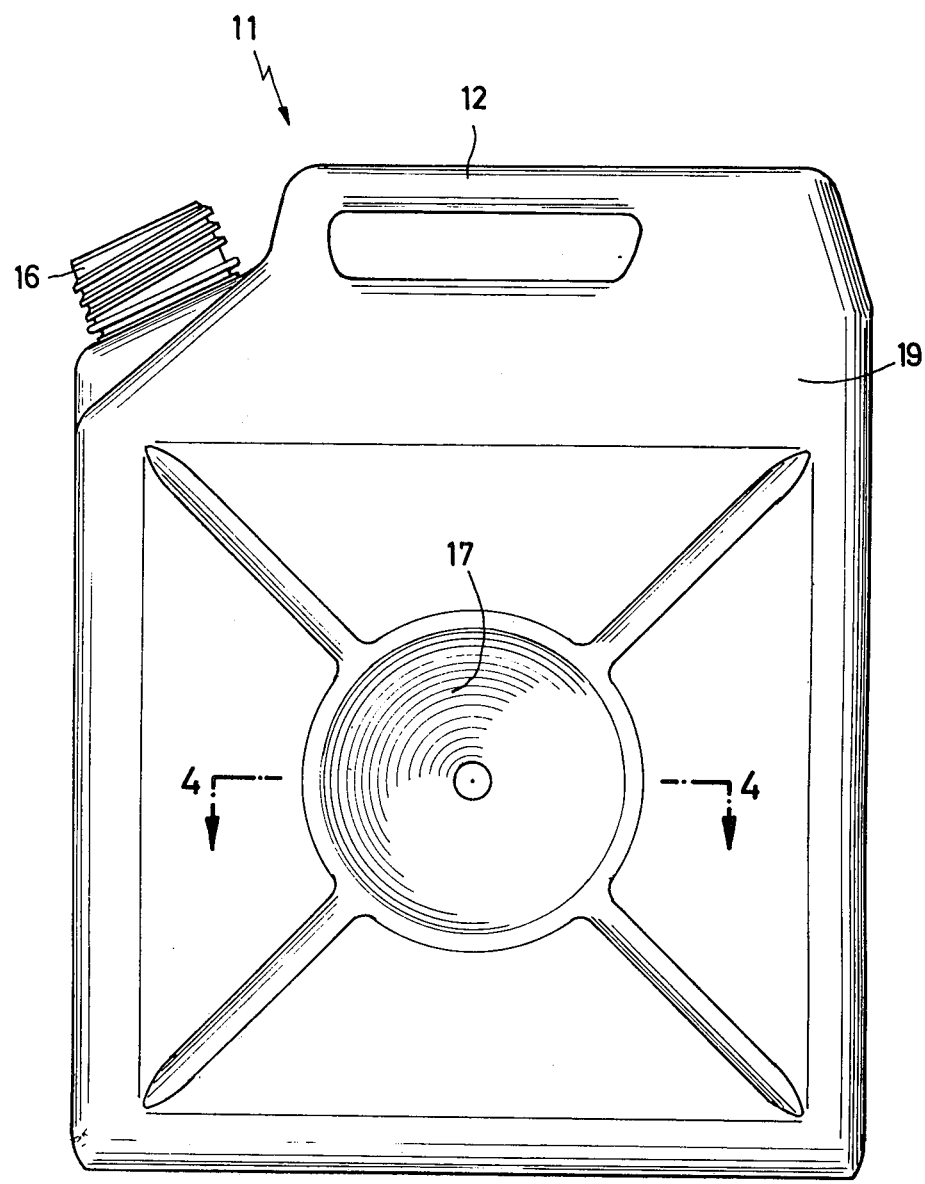

United States Patent [19]
Schiemann

[11] 3,940,002
[45] Feb. 24, 1976

[54] PLASTIC JERRY CAN
[76] Inventor: Wolfram Schiemann, Eugen-Nagele-Strasse, 714 Ludwigsburg, Germany
[22] Filed: Dec. 6, 1974
[21] Appl. No.: 530,155

Related U.S. Application Data
[62] Division of Ser. No. 347,572, April 3, 1973.

[30] Foreign Application Priority Data
Apr. 6, 1972   Germany............................ 2216524

[52] U.S. Cl.............................................. 215/1 C
[51] Int. Cl.² .......................................... B65D 1/18
[58] Field of Search............ 215/1 C; 220/4 R, 63 R

[56] References Cited
UNITED STATES PATENTS

| | | |
|---|---|---|
| 2,360,849 | 10/1944 | Clements...................... 220/4 R UX |
| 2,366,274 | 1/1945 | Luth ............................... 264/263 X |
| 2,781,551 | 2/1957 | Richerod......................... 215/1 C X |
| 2,959,812 | 11/1960 | Allen ................................. 264/98 X |
| 3,552,599 | 1/1971 | Redding............................... 220/72 |

Primary Examiner—Donald F. Norton

[57] ABSTRACT

Plastic jerry cans are formed from a pair of injection-molded surface-stabilized, low warpage plastic shells having high diffusion tightness and low surface resistance to electrical conduction. A contiguous plastic inner wall is blow-molded from the inside of the shells and is fused onto the interior surface of the shells. The inner wall seals the shell halves together at the flat bottom of cone-shaped inward dips on the large side surfaces of the shells.

14 Claims, 5 Drawing Figures

Fig. 2
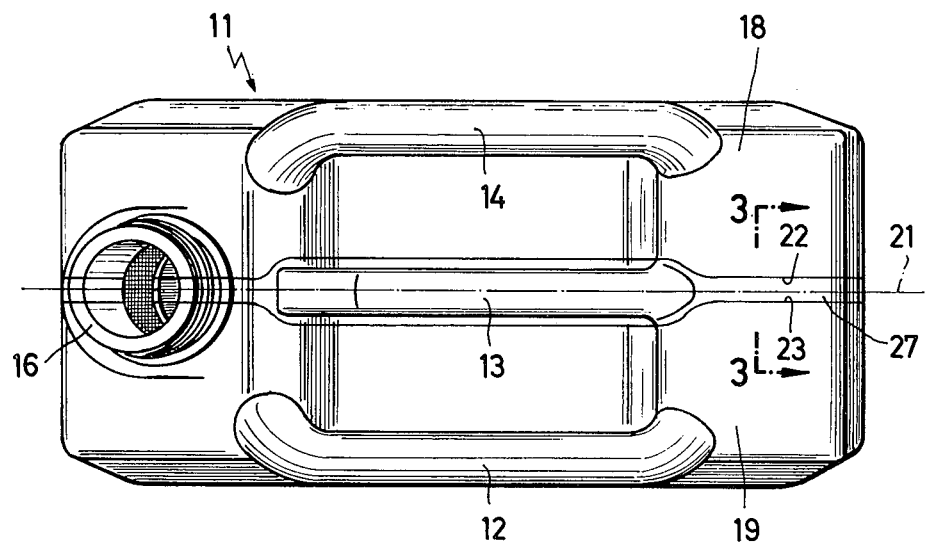
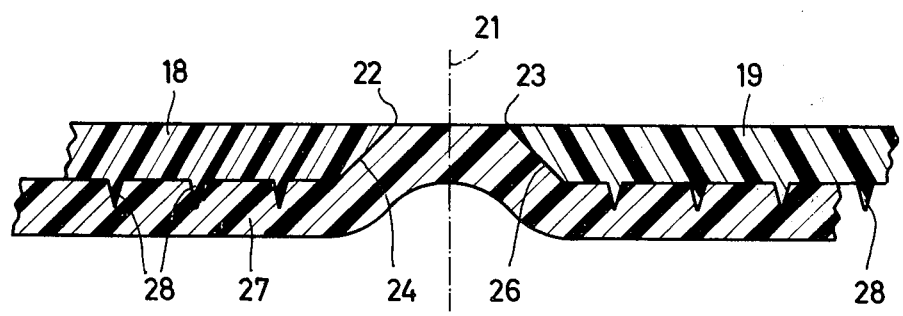
Fig. 3

PLASTIC JERRY CAN

This is a division of application Ser. No. 347,572, filed Apr. 3, 1973.

The invention covers a method for manufacturing plastic jerry cans intended mainly for easily combustible liquids, and a jerry can manufactured by this method.

So far, attempts to reproduce the 20-liter three-handle military steel jerry can in plastic have not been successful, even though plastic has been around a very long time. There are a number of reasons for this:

1. The jerry cans must be sufficiently diffusion tight. This means that during a certain time interval and within a certain temperature range, only so much fuel may diffuse (permeate) out of the jerry can. Together with the air, the fuel forms a combustible mixture which may ignite while handling the jerry cans. According to German safety regulations, the diffused fuel quantity per can may not exceed a certain amount, the size of the can notwithstanding. The diffused quantity of fuel depends on wall thickness and container surface. Since smaller cans have a smaller surface, there is less diffusion than permissible. However, with larger cans, in particular 20- and 30-liter cans, the surface is so large that, when using standard low-pressure polyethylene, too much of the contents may diffuse if the jerry can is filled with evaporating fuel.

2. While being shipped, jerry cans rub against each other. Electrostatic charges are caused. If the surface (skin effect) resistance of the can's material is too large, these charge potentials cannot be conducted away. Then the charges cannot be balanced quickly and sparkovers may develop while pouring, e.g., from the gas tank to the jerry can. These sparks may initiate explosions.

3. The jerry can must be able to withstand great temperature differentials. Plastic jerry cans which are only direct copies of the well-known steel three-handle jerry can will expand like a balloon at approx 70°C ambient temperature because an overpressure builds up inside.

4. The jerry cans must be formed so that they may be dropped suspended by their three handles, e.g., from a parachute, without having the opening jerk of the parachute damage the jerry can.

5. The jerry cans must be such that they do not burst at any point if dropped at low temperatures from a height of several meters onto a concrete surface.

6. The shape of the jerry can must allow for the fact that there already exist very many mountings, pallets, storage areas, etc. which fit the 20-liter steel jerry can and which also must fit the plastic jerry can. The list of these requirements could be extended further.

Even though it is well-known that plastic cans can be manufactured easier thn those of steel, there is not yet available a good 20-liter plastic jerry can with three handles. It is also known that the plastic jerry cans do not have to be painted on the in- or outside after several years, so that these coats are saved. The costs arising from recycling steel cans constitutes a considerable share of the price of a new can. The ratio of recycling cost to purchase price for steel jerry cans is 1 : 4.

It is also known that plastic jerry cans can be manufactured at greatly reduced cost. This would be very important in the case of a mass-produced article.

There have been many attempts and experiments to combine diffusion tightness with antistatic properties and to attain adequate form stability. However, all these attempts have failed because they did not succeed in simultaneously controlling all parameters.

The purpose of this invention is to provide a method which solves all outstanding problems and by which, in addition to containers of any type, e.g., fuel tanks for automobiles, 20- and 30-liter jerry cans can be manufactured. Another part of the invention is to provide a design for a container, in particular a jerry can.

For solving this problem, the invention's method provides the following steps:

a. At least two shells conforming to the shape of the jerry can are formed from a surface-stabilized, low-warpage material of sufficiently high diffusion tightness and sufficiently low skin effect resistance.

b. The shells are placed in a blow form half each.

c. With the blow form halves closed, a contiguous wall is blown from the inside onto the interior surfaces of the shells.

d. Both for the shells and the blown material, a heat seal material is used.

"Surface-stabilized" is used in a customary sense to mean that the material is stabilized against reduction at its surface from light or oxygen due to additives in the plastic material. "Skin-effect or surface resistance" is used in a customary sense to mean the resistance between opposite sides of a unit square of the surface of a material. If the surface resistance is low enough, the electric charge can flow to oppositely charged or less charged areas, so that a voltage charge on the surface of the material is dissipated.

Figure 4:
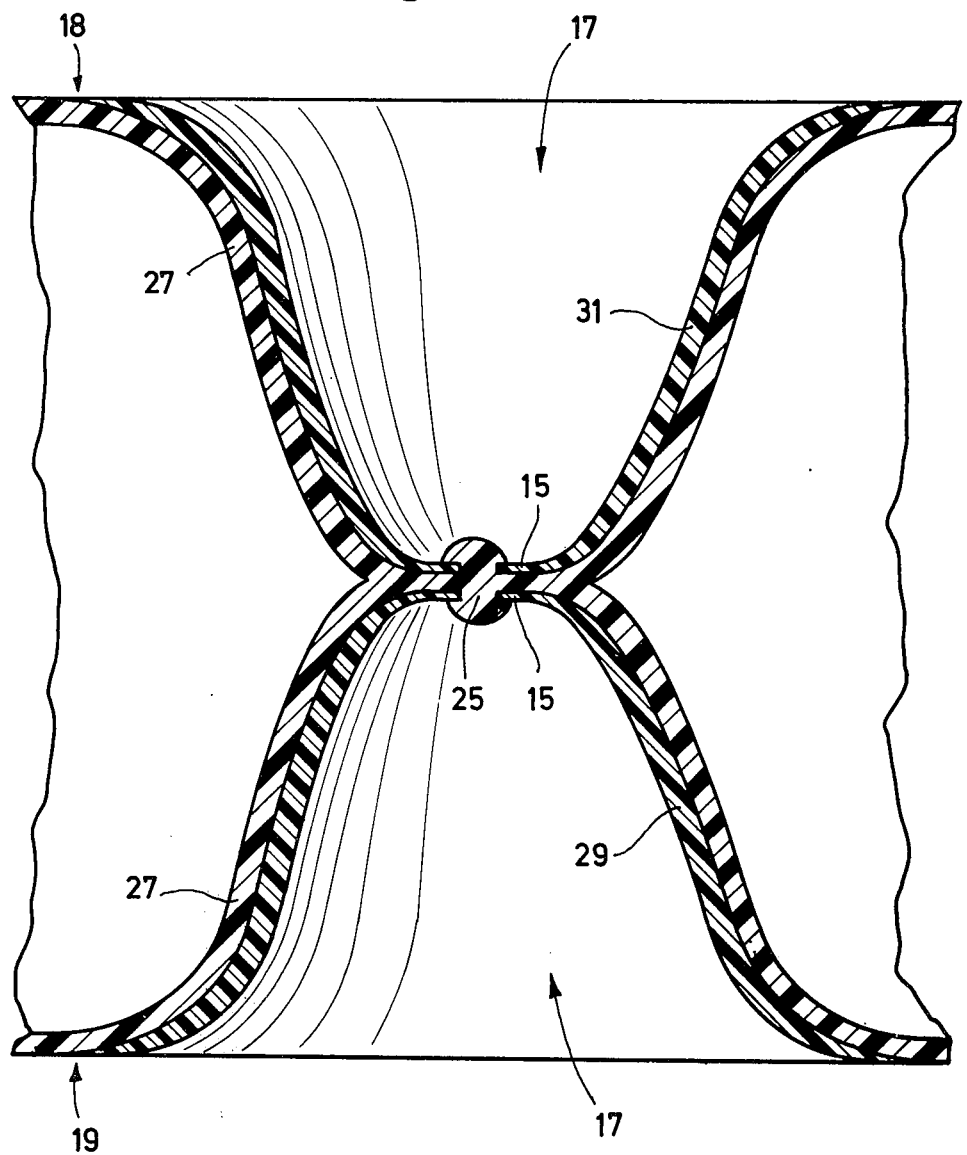
Figure 5:
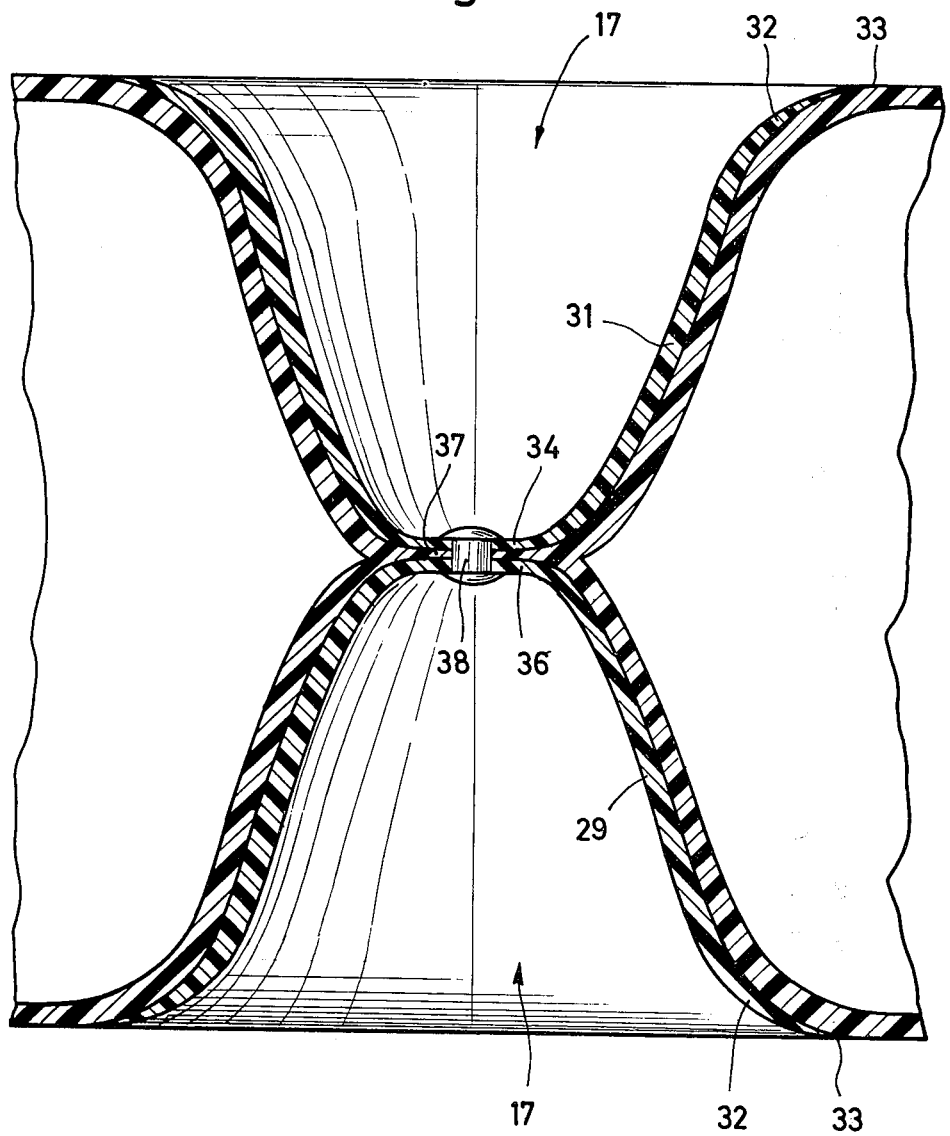

Further advantages and characteristics of the invention are contained in the following description of preferred examples: The drawings show the following:

FIG. 1 side view of a 20-liter jerry can with screw cap,

FIG. 2 top view of jerry can similar to FIG. 1,

FIG. 3 section along line 3—3 in FIG. 2,

FIG. 4 section along line 4—4 in FIG. 1 for a different design,

FIG. 5 section along line 4—4 in FIG. 1 for yet another design.

A 20-liter military type jerry can 11 of polyethylene has three handles 12, 13, 14 and spout 16, e.g., with external threads. One could also use the conventional ball clip or ring cap. Near the intersection of the diagonals on the large side surface of jerry can 11 there is provided a cone-shaped dip 17 which extends so far that it touches the opposite wall and can provide the basis for a solid connection yet to be described.

Jerry can 11 has two shells 18, 19 located symmetrically relative to the center plane 21 of the jerry can. Handle 14 has been molded onto shell 18, and handle 12 is molded onto shell 19. Edges 22, 23 of shells 18, 19 terminate shortly before center plane 21 and even recede somewhat near handle 13. Edges 22, 23 have a chamfer 24, 26 facing the inside. An extruded hose 27 has its outside heat sealed to the interior surface of shells. As used herein, the hose 27 is the extruded cylindrical tube which is extruded from a die before blow-molding. To accomplish better fusion, shells 18, 19 on their inside have numerous small cones 28 which might cut into the outer surface of hose 27 but do not penetrate hose 27. Hose 27 appears on the outside only in the area between edges 22, 23 and, because of chamfers 24, 26, can conform well and there are no transition difficulties.

In manufacture one first forms shells 18, 19 with handles 12, 14 and the cone-shaped inversion. The die casting method is used. With this method, the die mold is not completely closed by several tenths of a milimeter, the hollow space is injected and after the injection the mold is closed completely. This packs the material in the mold and it becomes more inherently stable, true to size and diffusion-resistant, than thermoplastic or extrusion material injected in the conventional manner. In most cases the die-casting pressure is 15 atmospheres above gauge and more. The material is a polyethylene type with a surface (skin effect) resistance considerably below $10^9$ ohms. It is preferable to use a material with a surface resistance of $10^6$ ohms. After die-casting the shells 18, 19 are heated to about 110°C. Then each shell is placed in one half of a blow mold. Jerry cans are always blown upside down with the spout 16 serving as inlet for the blow spindle sleeve. Now hose 27 is blown by the conventional blowing method so that in the hot state it conforms to shells 18, 19 from the inside. Cones 29, 31 are enveloped by the paraffin-like skin of hose 27 and welded together. Hose 27 likewise consists of polyethylene, but one that is particularly diffusion tight. The size of shell 18, 19 may attain the dimension up to half of a jerry can. Shells 18, 19 contain handle 12 or 14, respectively, and the cone-shaped dip 17 in the form of a blind-end hole. In FIGS. 4 and 5, the cones or shells 17 reach only as far as shown; their outer extremities do not cover the side walls of the can 11. The blown liner 27 forms the whole outer surface of the can 11 except for the area covered by the bell-like cone 17. In the example shown in FIG. 4, dip 17 in bottom surface 15 has a hole 20. This hole 20 must be large enough that hose 27, which seals the two symmetrical shells 18, 19 together, can pass through the hole in bottom 15 of dip 17 and hence effects a rivet head like sealing (welding) 25 of dips 17. The interior surfaces of dips 17 are roughened heavily. They may, however, also be provided with sharp points. The purpose of the dip 17 is to prevent balloon-like expansion in case of a temperature effect on the jerry can filled with evaporative fuel.

For another example in FIG. 5, shells 18, 19 are reduced to two truncated cones 29, 31. Through fillet 32 they turn into the outside wall of the jerry can and terminate toward the edge in a thin point 33, thus accomplishing smooth transition. The two truncated cone flats 34, 36 are sufficiently apart to accommodate sufficient hose material 37. In this connection it should be pointed out that this invention never uses material less than 1 mm thick. Rather, the wall thicknesses are such that they can withstand rough usage. The total wall thickness for a 20-liter jerry can is 5–10 mm. The wall thicknesses may be apportioned half to the hose material and half to the injected material. It is not the purpose of the truncated cones 29, 31 to reduce the surface (skin effect) resistance and the diffusion. Their purpose is to make the blown wall of the jerry can in this area more inherently stable. If dip 17 is produced only during blowing, it can happen that hose material 37 fuses but turns out too thin because of excessive expansion, i.e. stretching of the hose material. To prevent this, injection molded shells are used. The forces to be absorbed here may be very large. For instance, in a gasoline can at 75° the internal pressure is 3.5 atmospheres above gauge (1 atmosphere = 1 kg/cm$^2$). FIG. 5 indicates that the truncated cones are rather slender. As a result, they take as little room as possible from the jerry can interior. In addition, the sidewalls of dips 17 are aligned better so that they are stressed essentially under tension only. This is the type of stress under which synthetic material holds up very well.

The truncated cone flats are just large enough to accommodate the rivet heads of of the two-head rivet connection 38. The shank of the two-head rivet connection has a relatively large diameter.

Dips 17 of the two shells 18, 19 are identical for the first example.

The center handle 13 is made of hose material and can be manufactured by a procedure as described in French Pat. No. 7,018,685.

Regarding diffusion tightness it should be pointed out that the hose material bears the major burden and that the shell material only furnishes the remainder of the required diffusion tightness. One should also mention that hose 27 must be made of thermoplastic material, while shells 18, 19 may be from thermoplastic or thermosetting or glassfiber reinforced synthetic. The only requirement is that the hose material can be fused to the shell material.

What is claimed is:

1. A plastic jerry can comprising an outside wall which consists of a surface-stabilized low-warpage material of sufficiently high diffusion density and sufficiently low surface, skin effect resistance, which material is injected in the form of shells forming a portion of the shape of said jerry can, and
    a contiguous blow molded plastic wall sealed onto and around the interior surface of the shells.

2. A plastic jerry can according to claim 1 comprising handles in one piece with the shells.

3. A plastic jerry can according to claim 2 in which the jerry can has three handles and each shell mounts at least one of the two outer handles.

4. A plastic jerry can according to claim 1 in which the inside of the shells is roughened.

5. A plastic jerry can according to claim 1 in which the insides of the shells have numerous sharp points which do not penetrate the adjacent plastic blow molded wall but cut slightly into the blow molded plastic wall.

6. A plastic jerry can for easily combustible liquids having a shape including large faces and end faces comprising
    an outside wall comprising two slender truncated cones forming a portion of the shape of the jerry can and comprised of a surface-stabilized, low warpage material of surface, skin effect resistance considerably below $10^9$ ohms,
    said cones having holes in spaced-apart truncated end-portions thereon,
    said cones projecting inward at the large faces of the jerry can,
    a wall of highly diffusion-tight, blow molded tube sealed onto and around the interior surface of the truncated cones and in the space between the spaced-apart end portions of the truncated cones, and
    rivet-like means through the holes in the truncated end portions for fastening the truncated cones to each other with the blow molded material in the space between them.

7. A plastic jerry can according to claim 6 in which said truncated cones have outwardly turned edges which transition smoothly into said blow molded wall.

8. A plastic jerry can according to claim 6 in which said truncated cones are die-cast injection molded.

9. A plastic jerry can according to claim 6 in which said truncated cones have a high diffusion density.

10. A plastic jerry can according to claim 6 in which said rivet-like means comprises blow-molded tube pressed through said holes.

11. A plastic jerry can according to claim 10 in which said rivet-like means comprises a rivet-head-like fused joint through said holes which are aligned with each other.

12. A plastic jerry can according to claim 6 in which said rivet means comprises a plastic rivet with rivet heads on the portions protruding through said truncated end portions.

13. A plastic jerry can according to claim 6 comprising a roughened inner surface on said cones.

14. A plastic jerry can according to claim 13 in which said roughened inner surface comprises numerous sharp points which penetrate the surface but do not penetrate through said blow molded wall.

* * * * *